United States Patent
Jenness et al.

(10) Patent No.: US 10,309,535 B2
(45) Date of Patent: Jun. 4, 2019

(54) PISTON RING FOR AN INTERNAL COMBUSTION ENGINE

(71) Applicant: Federal-Mogul Corporation, Southfield, MI (US)

(72) Inventors: Blair Matthew Jenness, Grosse Pointe Park, MI (US); Matthew Ryan Pedigo, Howell, MI (US); Ronald Nelson Radunzel, Rockford, MI (US)

(73) Assignee: Tenneco Inc., Lake Forest, IL (US)

( * ) Notice: Subject to any disclaimer, the term of this patent is extended or adjusted under 35 U.S.C. 154(b) by 525 days.

(21) Appl. No.: 13/768,284

(22) Filed: Feb. 15, 2013

(65) Prior Publication Data

US 2013/0213217 A1 Aug. 22, 2013

Related U.S. Application Data

(60) Provisional application No. 61/600,163, filed on Feb. 17, 2012.

(51) Int. Cl.
*F16J 9/06* (2006.01)
*F02F 11/00* (2006.01)

(52) U.S. Cl.
CPC .............. *F16J 9/06* (2013.01); *F02F 11/005* (2013.01); *F16J 9/063* (2013.01)

(58) Field of Classification Search
CPC .................................................... F16J 9/06
See application file for complete search history.

(56) References Cited

U.S. PATENT DOCUMENTS

| | | | |
|---|---|---|---|
| 580,090 A | 4/1897 | Lewis |
| 945,233 A | 1/1910 | Hatch |
| 1,015,502 A | 1/1912 | Meaker |
| 1,218,132 A | 3/1917 | Tuhey |
| 1,436,130 A | 11/1922 | Webb |
| 1,682,130 A | 1/1926 | Johnston |
| 1,871,820 A | 8/1932 | Morton |
| 1,959,769 A | 5/1934 | Simmen |

(Continued)

FOREIGN PATENT DOCUMENTS

| CN | 1155044 A | 7/1997 |
|---|---|---|
| CN | 101798969 A | 8/2010 |

(Continued)

OTHER PUBLICATIONS

International Search Report, dated Jul. 4, 2013 (PCT/US2013/026304).

*Primary Examiner* — F Daniel Lopez
(74) *Attorney, Agent, or Firm* — Robert L. Stearns; Dickinson Wright, PLLC

(57) ABSTRACT

A piston ring assembly for sealing a cylinder wall to a piston body is provided. The piston ring assembly includes a plurality of rings stacked in an axial direction one in abutment with another. Each ring has an inner face and an outer face. The piston ring assembly also includes a spring which substantially circumferentially surrounds the stacked rings and abuts the outer faces of the rings. The spring biases the stacked rings in a radially inward direction for sealing the inner faces of the rings against the piston body. The spring may be of a strip of material bent into a serpentine pattern when in an at rest condition to apply the biasing force against the piston body.

3 Claims, 5 Drawing Sheets

(56) References Cited

U.S. PATENT DOCUMENTS

| | | | | |
|---|---|---|---|---|
| 2,068,115 | A | * | 1/1937 | Solenberger ............. F16J 9/067 |
| | | | | 277/446 |
| 2,203,208 | A | * | 6/1940 | Solenberger ............... F16J 9/20 |
| | | | | 277/485 |
| 2,426,613 | A | | 8/1945 | Jackson |
| 2,466,428 | A | * | 4/1949 | Hufferd et al. ............... 277/468 |
| 2,514,016 | A | | 7/1950 | Casado |
| 2,859,079 | A | * | 11/1958 | Olson ...................... F16J 9/063 |
| | | | | 277/477 |
| 2,893,799 | A | * | 7/1959 | Marien ...................... F16J 9/06 |
| | | | | 277/481 |
| 3,548,721 | A | | 12/1970 | Eisennegger |
| 3,601,415 | A | * | 8/1971 | Bond ........................... 277/481 |
| 3,627,333 | A | * | 12/1971 | Hill ......................... F16J 9/066 |
| | | | | 277/478 |
| 3,777,722 | A | | 12/1973 | Lenger |
| 5,788,246 | A | | 8/1998 | Kuribayashi et al. |
| 6,675,762 | B2 | | 1/2004 | Han |
| 7,735,834 | B2 | | 6/2010 | Hofbauer |
| 2006/0102131 | A1 | | 5/2006 | Han |
| 2010/0171273 | A1 | * | 7/2010 | Lahrman .................. F16J 9/064 |
| | | | | 277/467 |
| 2010/0319661 | A1 | | 12/2010 | Klyza |
| 2010/0326391 | A1 | | 12/2010 | Mierisch et al. |

FOREIGN PATENT DOCUMENTS

| | | |
|---|---|---|
| JP | S5146654 A | 4/1976 |
| JP | H06249341 A | 9/1994 |

\* cited by examiner

FIG. 4
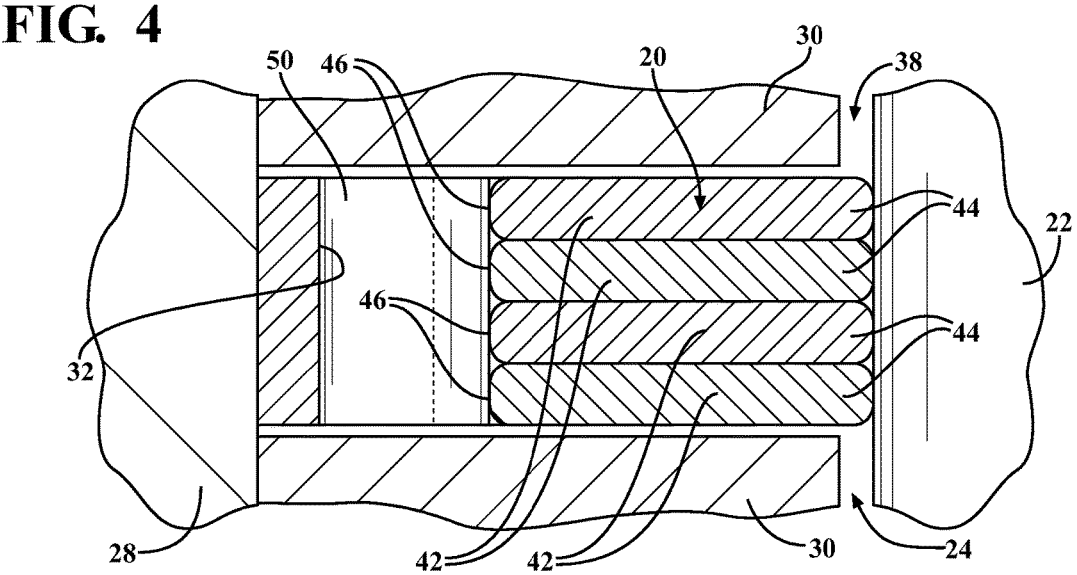
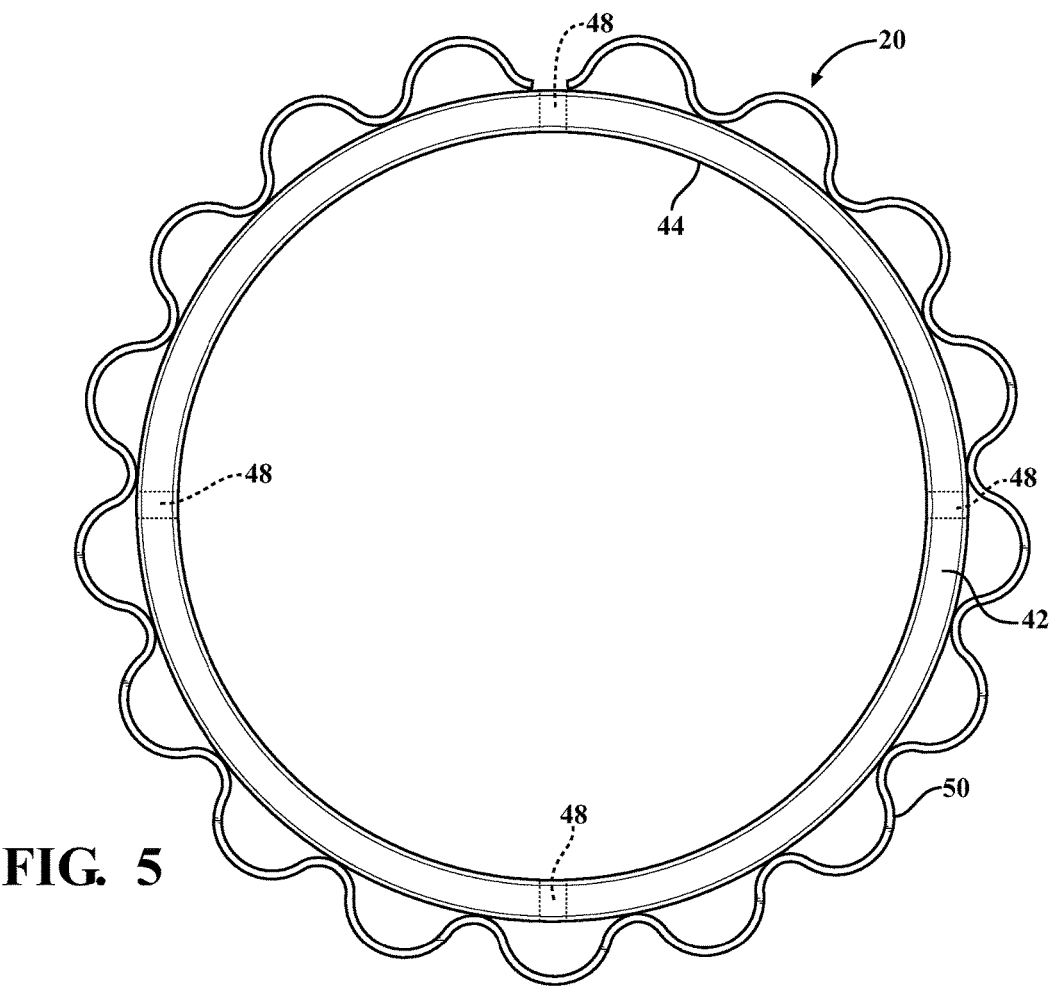
FIG. 5

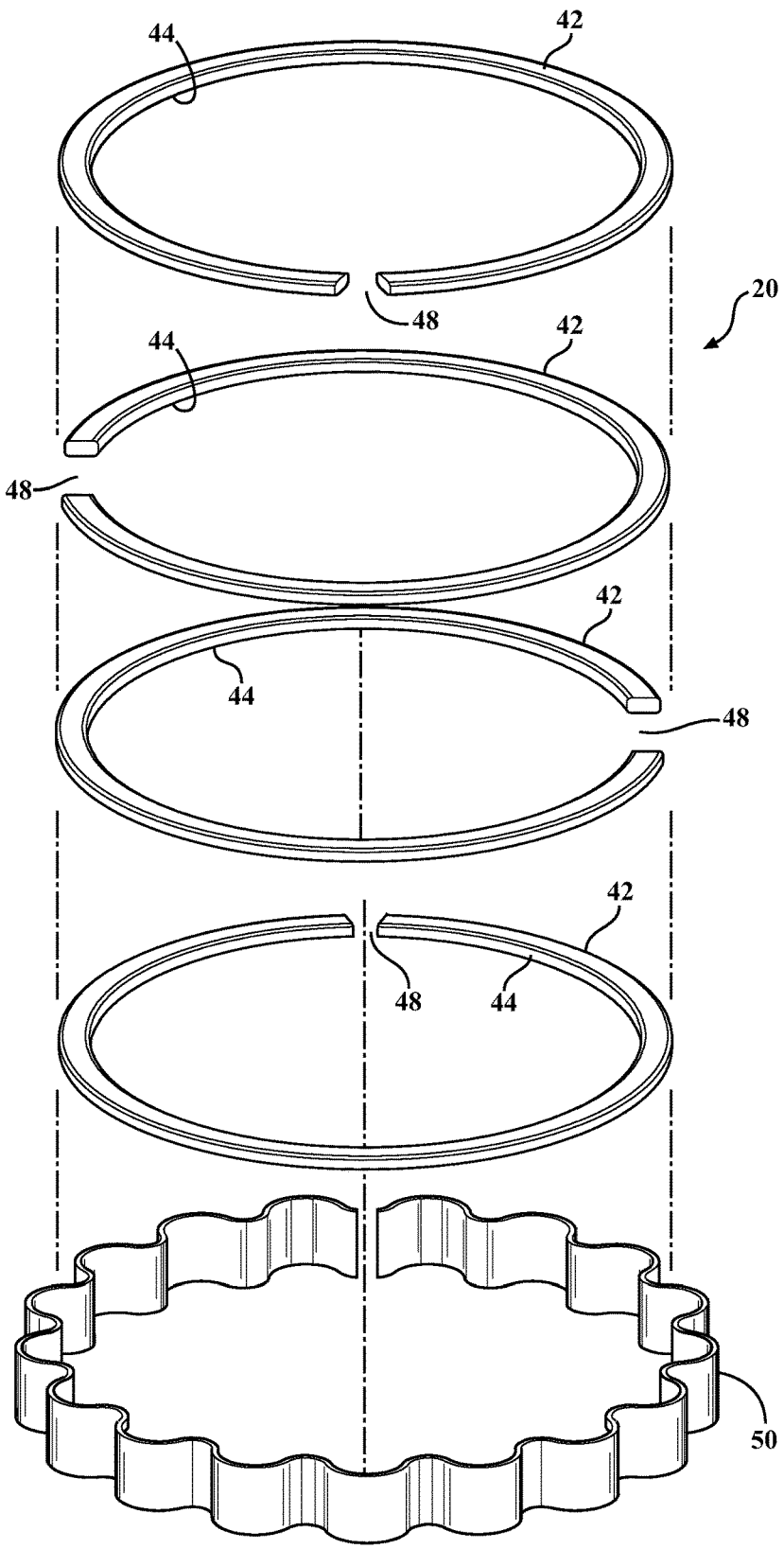

PISTON RING FOR AN INTERNAL COMBUSTION ENGINE

CROSS REFERENCE TO RELATED APPLICATION

This application claims the benefit of application Ser. No. 61/600,163 filed Feb. 17, 2012.

BACKGROUND OF THE INVENTION

1. Field of the Invention

The present invention relates generally to internal combustion engines having at least one reciprocating piston within a cylinder, and more particularly to seals between the reciprocating piston and a cylinder wall.

2. Related Art

Typical internal combustion engines are provided with at least one piston body which reciprocates within a cylinder of an engine block. In general, each piston body includes a plurality of ring grooves, each of which receives and operably supports a piston ring. In operation, the piston rings remain in the ring grooves and travel with their respective piston bodies in a reciprocating motion within cylinders of an engine block. Among other things, the pistons rings function to seal combustion gasses in a combustion chamber above the piston body, to transfer heat from the piston body to the cylinder wall, to restrict the passage of oil from the crank case to the combustion chamber and to provide a generally uniform oil film on the cylinder wall. Such piston rings are typically biased with a spring force in a radially outward direction against the cylinder wall to establish the seal between the piston body and the cylinder wall.

SUMMARY OF THE INVENTION

One aspect of the present invention provides for a piston ring assembly for sealing a cylinder wall to a piston body. The piston ring assembly includes a plurality of rings stacked in an axial direction one in abutment with another, and each of the rings has an inner face and an outer face. The piston ring assembly also includes a spring which substantially circumferentially surrounds the stacked rings and abuts the outer faces of the rings. The spring biases the stacked rings in a radially inward direction for sealing the inner faces of the rings against the piston body.

The piston ring assembly may be seated in a channel of a cylinder wall and sealed against the skirt of the piston body. As such, the piston ring remains generally stationary and does not move relative to the cylinder wall during operation of the engine. This location allows for increased stability of the piston body as it reciprocates in the cylinder of the engine without compromising the length of the skirt, i.e. the skirt may extend downwardly past the cylinder wall when the piston body is in a bottom dead center position. The piston ring is also resistant to blow by.

Another aspect of the present invention provides for a power cylinder assembly. The power cylinder includes a cylinder wall having a substantially circumferentially extending channel formed therein. The power cylinder assembly also includes a piston body having a skirt, and wherein at least a portion of an outer surface of the skirt extends substantially continuously around a circumference. Additionally, the power cylinder assembly includes a piston ring assembly disposed in the channel of the cylinder wall. The piston ring assembly includes a plurality of rings, each having an inner face and an outer face, stacked in an axial direction on in abutment with another. The piston ring assembly further includes a spring which substantially circumferentially surrounds the stacked rings. The spring abuts the outer faces of the stacked rings and biases the stacked rings in a radially inward direction to seal the inner faces of the stacked rings against the circumferentially continuous portion of the skirt of the piston body.

BRIEF DESCRIPTION OF THE DRAWINGS

These and other features and advantages of the present invention will be readily appreciated, as the same becomes better understood by reference to the following detailed description when considered in connection with the accompanying drawings wherein:

FIG. 4 is a cross-sectional and fragmentary view showing the piston ring assembly of FIG. 1 disposed within a channel of a cylinder wall and in sealing engagement with a piston body;

FIG. 5 is a top elevation view of the piston ring assembly of FIG. 1; and

FIG. 6 is an exploded view of the piston ring assembly of FIG. 1.

DESCRIPTION OF THE ENABLING EMBODIMENT

Figure 1:
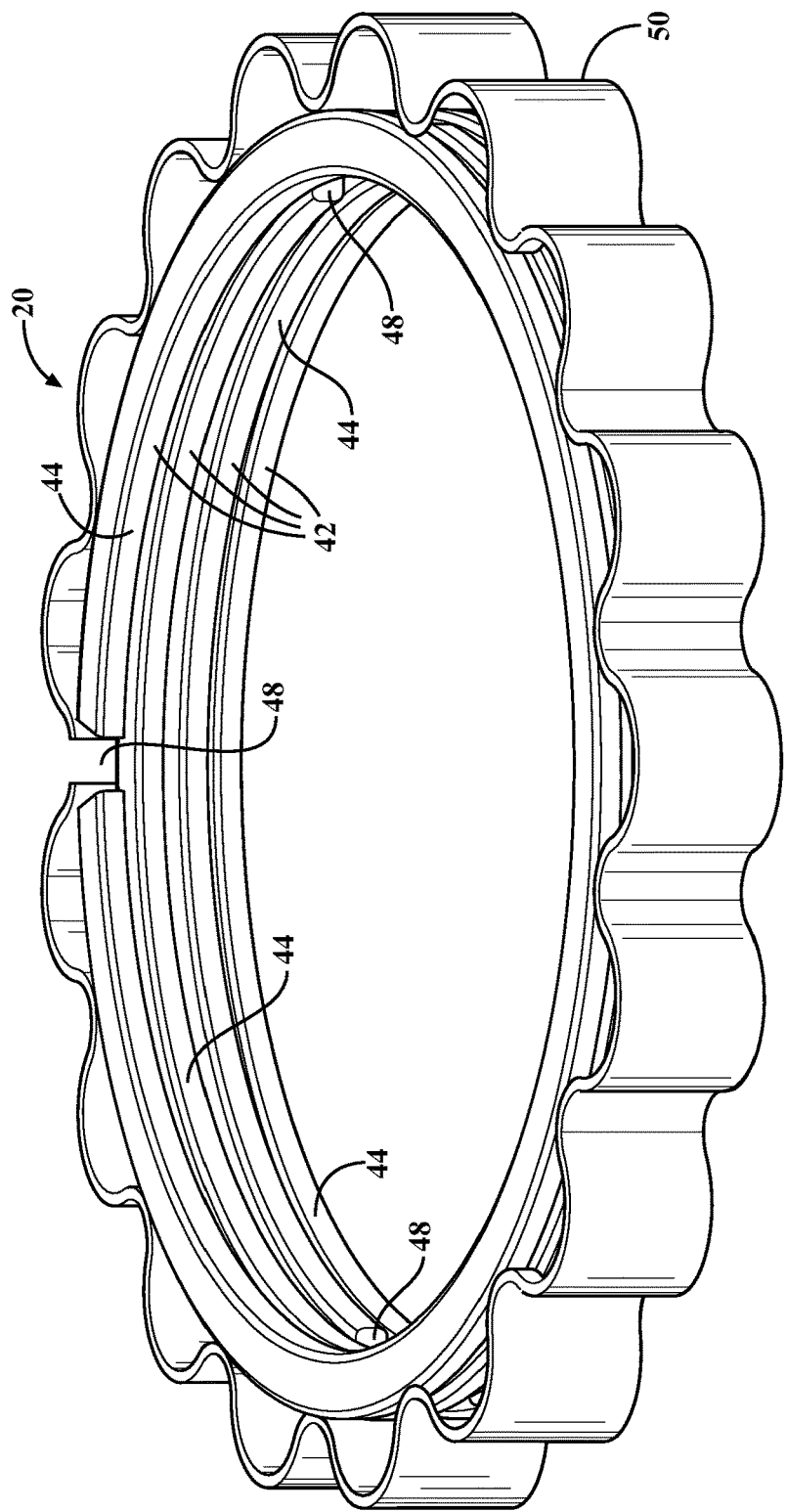
FIG. 1 is a perspective and elevation view of an exemplary embodiment of a piston ring assembly.

Referring to the Figures, wherein like numerals indicate corresponding parts throughout the several views, an exemplary embodiment of a piston ring assembly 20 for sealing a piston body 22 to a cylinder wall 24 of a power cylinder assembly 26 of an internal combustion engine is generally shown in FIG. 1. Referring now to the cross-sectional views of FIGS. 2 and 3, the exemplary piston ring 20 is shown as installed in a power cylinder assembly 26 of an internal combustion engine having an engine block 28 and a two-piece cylinder liner 30 which together present an axially extending cylinder wall 24 having a channel 32 that extends substantially circumferentially around the cylinder wall 24. Specifically, in the exemplary embodiment, the piston ring 20 is disposed between ends of the cylinder liner 30 pieces which are spaced axially from one another to present the aforementioned channel 32. However, it should be appreciated that the channel 32 could be formed into the cylinder wall 24 through a range of different manners. For example, the channel 32 could be formed directly into the engine block 28 without any cylinder liner 30. The exemplary piston ring 20 is shown installed in a diesel fueled compression ignition engine; however, it should be appreciated that the piston ring 20 could alternately be used in a range of different types of internal combustion engines including, for example, spark ignition engines or horizontally opposed two piston per cylinder engines.

Figure 2:
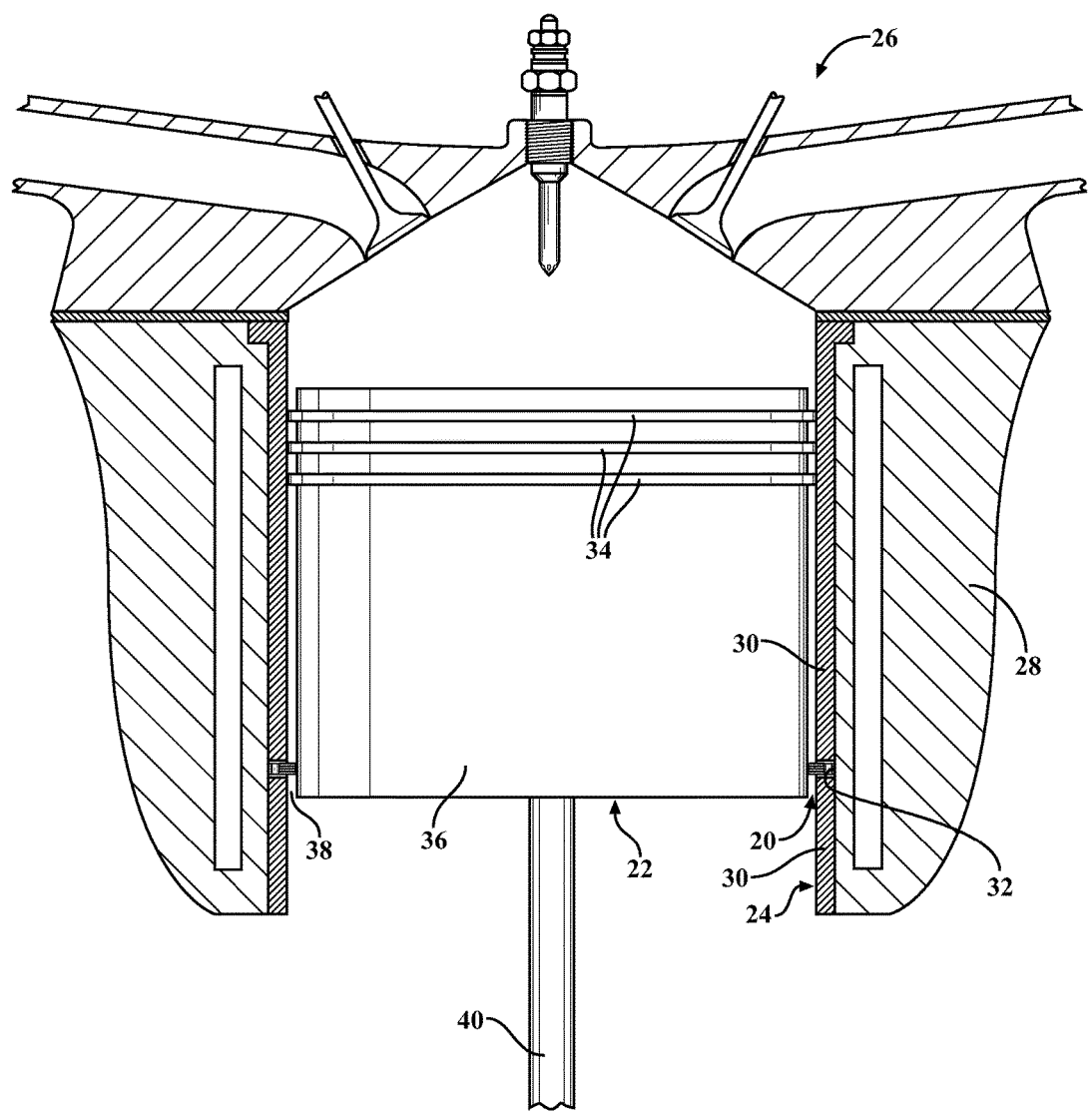
FIG. 2 is a sectional view of an exemplary embodiment of a power cylinder assembly and including the piston ring assembly of FIG. 1 and showing a piston body in a top dead center position.
Figure 3:
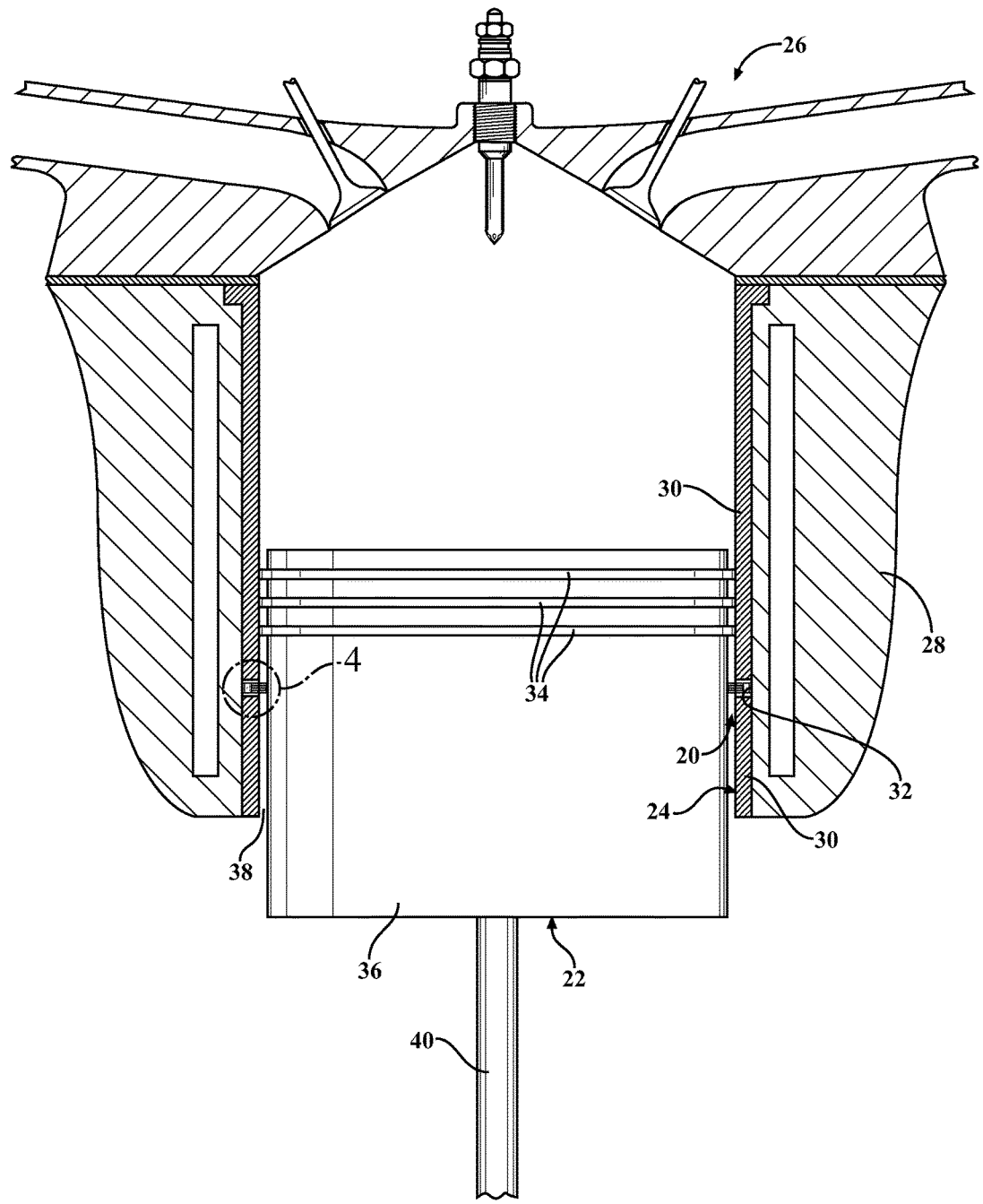
FIG. 3 is another sectional view of the exemplary embodiment of the power cylinder assembly with the piston ring assembly of FIG. 1 and showing the piston body in a bottom dead center position.

Referring still to FIGS. 2 and 3, the piston body 22 of the exemplary power cylinder assembly 26 includes one or more upper piston rings 34 (a plurality being illustrated in the exemplary embodiment) which are carried in associated ring grooves formed in the outer wall of the piston body 22. The piston body 22 also has a skirt 36 which depends from the piston ring 20 region and helps guide the piston body 22 during reciprocation within the cylinder during operation of the engine. At least a portion of the skirt 36 is generally cylindrically-shaped and has an outer surface which extends continuously around a circumference. This portion of the skirt 36 is sized to be close to but relatively smaller than the inner diameter of the cylinder wall 24 such that there is an operating gap 38 therebetween. The piston body 22 is coupled by a wrist pin (not shown) or a similar type of connection device to a connecting rod 40, which in turn is coupled to a crank shaft (not shown) or a similar mechanism.

Referring still to FIGS. 2 and 3, in its location in the channel 32 of the cylinder wall 24, the exemplary piston ring 20 is mounted stationarily relative to the engine block 28 and is sealed against the outer surface of the skirt 36 of the piston body 22 to establish a gas and fluid tight seal between the cylinder wall 24 and the piston body 22. The piston ring assembly 20 has an inner face 42 (best shown in FIG. 4) that is in running contact with the skirt 36 of the piston body 22 during operation of the engine to seal combustion gasses in the combustion chamber on one side of the piston body 22 and to seal oil on the other side of the piston body 22, e.g. in a crank case (not shown) or any other oil chamber. During operation of the engine, the piston body 22 moves up and down within the cylinder wall 24 between a top dead center position shown in FIG. 2 and a bottom dead center position shown in FIG. 3. As shown, the exemplary piston ring assembly 20 remains in sealing engagement with the circumferentially continuous portion of the skirt 36 to maintain the gas and oil tight seal throughout the piston body's 22 range of travel. The location of the piston ring assembly 20 in the channel 32 of the cylinder wall 24 allows for increased stability of the piston body 22 as it reciprocates in the cylinder of the engine without compromising the length of the skirt 36, i.e. the skirt 36 may extend downwardly into the crank case (not shown) when the piston body 22 is in the bottom dead center position.

Referring now to FIG. 4, the piston ring assembly 20 of the exemplary embodiment includes a plurality of individual and separately formed rings 42 which are stacked in an axial direction one in abutment with another. Each of the exemplary rings 42 has a rounded inner face 44; a rounded outer face 46; and generally flat top and bottom faces, and the top and bottom faces of adjacent rings 42 are in face-to-face abutting relationship with one another along their respective full radial lengths. As such, the inwardly-facing surface of the piston ring assembly 20 includes a plurality of sealing surfaces to provide the oil and gas seal between the cylinder wall 24 and the outer surface of the piston body's skirt 36. In the exemplary embodiment, the piston ring assembly 20 includes four rings 42. However, it should be appreciated that any number of rings 42 greater than one could be employed.

Referring now to the exploded view of FIG. 6, each ring 42 has ends that are separated from one another by a ring gap 48, and the ring gaps 48 of adjacent rings 42 are staggered circumferentially from one another. This improves the oil scraping and gas sealing performance of the piston ring assembly 20 by providing a circumferentially continuous seal around the piston body 22. The rings 42 are preferably not attached to one another.

Referring back to FIG. 1, the piston ring assembly 20 additionally includes a spring 50 which substantially circumferentially surrounds the stacked rings 42 and abuts the outer faces 46 of the stacked rings 42 to bias the stacked rings 42 in a radially inward direction. This has the effect of sealing the inner faces 46 of the rings 42 against the piston body 22 (shown in FIGS. 2 and 3). The spring 50 of the exemplary embodiment is of a strip-like piece of metal, such as spring steel, and extends sinusoidally in a generally serpentine pattern having peaks and valleys. As shown in FIG. 4, the serpentine spring 50 alternates between engagement with the outer surfaces of the stacked rings 42 and into engagement with a back wall of the channel 32 in the cylinder wall 24. When inserted between the stacked rings 42 and the cylinder wall 24, the serpentine spring 50 strains towards its at-rest condition, thereby biasing the stacked rings 42 in the radially inward direction to establish the gas and oil tight seal between the cylinder wall 24 and the piston body 22. As shown, the distance between the inner and outer faces 44, 46 of the stacked rings 42 is greater than the operating gap 38 between the outer surface of the skirt 36 of the piston body 22 thereby substantially preventing the flow of oil and gas through gaps in the serpentine spring 50 and past the piston ring assembly 20.

The rings 42 and the serpentine spring 50 may be formed through any desirable manufacturing process and may be of any desirable material including, for example, cast iron or steel. The rings 42 may also either be uncoated or may have a wear resistant coating (such as chromium, chromium with aluminum oxide ceramic [CKS], chromium with microdiamond [GDC], etc.) applied to at least their inner faces 44.

The exemplary description of the embodiment is meant to be illustrative and not limiting of the invention. Variations and modifications to the disclosed embodiment may become apparent to those skilled in the art and come within the scope of the invention.

What is claimed is:

1. A power cylinder assembly, comprising:
a cylinder liner having a channel on an inside wall thereof having upper and lower surfaces of the channel that are axially spaced to define a first height, said channel extending circumferentially around said inside wall;
a piston body having a plurality of ring grooves and a plurality of piston rings disposed in said ring grooves of said piston body with one piston ring being disposed in each of said ring grooves;
a piston ring assembly disposed in said channel of said cylinder liner;
said piston ring assembly having a plurality of split rings stacked in face-to-face contact with one another in an axial direction, said plurality of split rings including a top split ring and a bottom split ring, said split rings providing said piston ring assembly with a second height that is less than said first height of said channel when said piston ring assembly is installed in said channel of said cylinder liner, each of said split rings having an inner face with a rounded edge and an outer face with a rounded edge, and each of said split rings having a generally constant cross-sectional shape in a circumferential direction;
each of said split rings having a flat top face and a flat bottom face extending between said rounded edges of said inner and outer faces;
adjacent ones of said flat top and bottom faces of said split rings being in direct contact with one another along their respective full lengths;
said flat top face of said top split ring directly facing and being able to contact said upper surface of the channel, and said flat bottom face of said bottom split ring directly facing and being able to contact said lower surface of the channel;

said piston ring assembly further including a single spring substantially circumferentially surrounding said split rings and abutting said outer faces and biasing said split rings in a radially inward direction to seal all of said inner faces of said split rings against a circumferentially continuous portion of said skirt of said piston body; and wherein said spring has a generally serpentine shape which extends through a plurality of peaks and a plurality of valleys.

2. The power cylinder assembly as set forth in claim 1 wherein each of said rings has a gap and wherein said gaps of adjacent split rings are staggered circumferentially from one another.

3. The power cylinder assembly as set forth in claim 1 wherein said plurality of split rings is further defined as four rings.

\* \* \* \* \*